US012656721B2

(12) United States Patent
Kurita et al.

(10) Patent No.: US 12,656,721 B2
(45) Date of Patent: Jun. 16, 2026

(54) IMAGE FORMING APPARATUS

(71) Applicant: Toshiba Tec Kabushiki Kaisha, Tokyo (JP)

(72) Inventors: Suguru Kurita, Sunto Shizuoka (JP); Ken Iguchi, Numazu Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/664,107

(22) Filed: May 14, 2024

(65) Prior Publication Data

US 2025/0138471 A1 May 1, 2025

(30) Foreign Application Priority Data

Oct. 26, 2023 (JP) ................................. 2023-184106

(51) Int. Cl.
| | |
|---|---|
| *G03G 21/06* | (2006.01) |
| *G01N 21/31* | (2006.01) |
| *G03G 15/00* | (2006.01) |
| *G03G 15/01* | (2006.01) |

(52) U.S. Cl.
CPC ............. *G03G 21/06* (2013.01); *G01N 21/31* (2013.01); *G03G 15/0121* (2013.01); *G03G 15/0189* (2013.01); *G03G 15/50* (2013.01)

(58) Field of Classification Search
CPC ........... G03G 15/5041; G03G 15/5054; G03G 15/5058; G03G 15/0131
See application file for complete search history.

(56) References Cited

U.S. PATENT DOCUMENTS

| | | | |
|---|---|---|---|
| 2009/0003864 A1* | 1/2009 | Yamaguchi ........ | G03G 15/5058 399/66 |
| 2011/0096452 A1* | 4/2011 | Miyaji ................... | G03G 21/08 361/212 |
| 2012/0237233 A1* | 9/2012 | Kato ................. | G03G 15/0131 399/49 |
| 2015/0227103 A1 | 8/2015 | Ogata et al. | |

(Continued)

FOREIGN PATENT DOCUMENTS

| | | |
|---|---|---|
| JP | 2012-150294 A | 8/2012 |
| JP | 2014-102437 A | 6/2014 |

(Continued)

OTHER PUBLICATIONS

English Translation for JP 2017181581 (Year: 2017).*

(Continued)

*Primary Examiner* — Jessica L Eley
(74) *Attorney, Agent, or Firm* — Kim & Stewart LLP

(57) ABSTRACT

According to an embodiment, an image forming apparatus supplies toner to a photoreceptor on which an electrostatic latent image is formed. A toner sensor of the image forming apparatus outputs a signal corresponding to the amount of adhering toner on an image carrier to which the toner is transferred from the photoreceptor. A memory of the image forming apparatus stores a target value including a correction value of image stabilization control of stabilizing an image for each type of toner. The image forming apparatus performs the image stabilization control of setting an output value of the toner sensor to the target value including the correction value for each type of toner.

8 Claims, 11 Drawing Sheets

(56)                    References Cited

U.S. PATENT DOCUMENTS

2017/0108804 A1 *    4/2017  Nagata ............... G03G 15/6585
2018/0173145 A1      6/2018  Nakazato

FOREIGN PATENT DOCUMENTS

JP          2015152701  A       8/2015
JP          2016-151582  A       8/2016
JP          2017181581  A  * 10/2017   ......... G03G 15/0275
JP          2021-124610  A       8/2021

OTHER PUBLICATIONS

Notice of Reasons for Refusal (First Office Action) dated Apr. 14,
2026 mailed in counterpart Japanese Patent Application No. 2023-
184106, with English machine translation, 8 pages.

* cited by examiner

Amount of adhering toner

| Wavelength of static eliminating light [nm] | Color of toner | | | | |
|---|---|---|---|---|---|
| | Yellow | Magenta | Cyan | Black | White |
| ~400 | Without correction | Without correction | Without correction | Without correction | With correction |
| 400~480 | Without correction | With correction | With correction | Without correction | With correction |
| 480~570 | With correction | Without correction | With correction | Without correction | With correction |
| 570~ | With correction | With correction | Without correction | Without correction | With correction |

Fig.10

IMAGE FORMING APPARATUS

CROSS-REFERENCE TO RELATED APPLICATIONS

This application is based upon and claims the benefit of priority from the prior Japanese Patent Application No. 2023-184106, filed on Oct. 26, 2023, the entire contents of which are incorporated herein by reference.

FIELD

An embodiment described herein generally relates to an image forming apparatus.

BACKGROUND

An electrophotographic image forming apparatus forms color images using a developer containing toner of a plurality of colors (e.g., yellow, magenta, cyan, and black). The electrophotographic image forming apparatus measures the amount of toner caused to adhere to a transfer member by a toner sensor and performs image stabilization control such that the amount of toner measured by the toner sensor reaches a target value.

Meanwhile, for the purpose of a reduction in size or a reduction in cost, the image forming apparatus may be requested to be designed such that a distance between units in the apparatus is shortened or a constituent member is omitted. In the design in which the size is reduced or the cost is reduced, the following phenomenon may occur: part of static eliminating light applied to a photosensitive drum enters a toner sensor in the image forming apparatus. Such a phenomenon can be prevented from occurring by attaching a light-shielding wall that blocks the static eliminating light to the inside of the image forming apparatus, but this causes a problem that the structure defies the trend toward the reduction in size and the reduction in cost.

BRIEF DESCRIPTION OF THE DRAWINGS

FIG. 10 is a diagram showing a setting example as to whether correction corresponding to the wavelength of static eliminating light for the toner of each color is necessary or not in the digital multi-functional peripheral serving as the image forming apparatus according to the embodiment.

DETAILED DESCRIPTION

According to one embodiment, an image forming apparatus includes a photoreceptor, a static eliminator, a charger, an exposure device, a developing device, a toner sensor, a memory, and a processor. The static eliminator emits static eliminating light to be applied to the photoreceptor. The charger charges the photoreceptor from which electric charge is removed by the static eliminator. The exposure device forms an electrostatic latent image on the photoreceptor charged by the charger. The developing device supplies toner to the photoreceptor on which the electrostatic latent image is formed by the exposure device. The toner sensor outputs a signal corresponding to an amount of adhering toner on an image carrier to which the toner is transferred from the photoreceptor. The memory stores a target value including value a correction of image stabilization control of stabilizing an image for each type of toner. The processor performs the image stabilization control of setting an output value of the toner sensor to the target value including the correction value for each type of toner.

Figure 1:
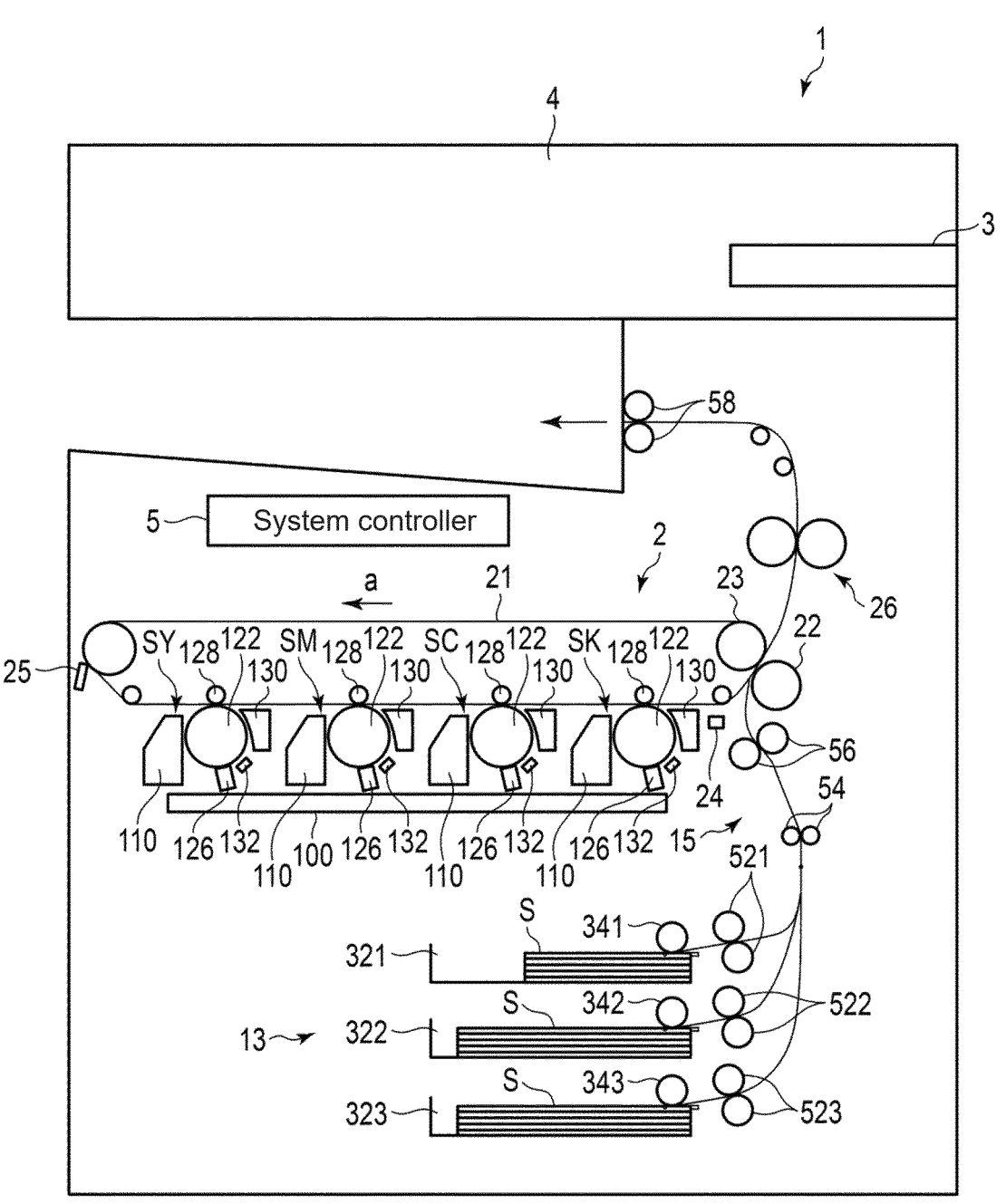
FIG. 1 is a diagram showing an example of a digital multi-functional peripheral serving as an image forming apparatus according to an embodiment.

Hereinafter, this embodiment will be described with reference to the drawings. In the drawings, the same reference symbols denote the same or similar portions. First, a configuration of a digital multi-functional peripheral (MFP) 1 serving as an image forming apparatus according to an embodiment will be described. FIG. 1 is a block diagram showing a configuration example of a digital multi-functional peripheral 1 serving as an image forming apparatus according to an embodiment. As shown in FIG. 1, the digital multi-functional peripheral 1 includes a printer 2, an operation panel 3, a scanner 4, a system controller 5, and the like. The digital multi-functional peripheral 1 is an example of an image forming apparatus placed in a workplace or the like.

The printer 2 is an image forming apparatus that forms an image on a recording medium. The printer 2 included in the digital multi-functional peripheral 1 is an image forming apparatus that forms an image on a recording medium by an electrophotographic method. The printer 2 forms an image (toner image) on a recording medium such as paper using toner. The recording medium on which the printer 2 forms an image only needs to be one capable of forming an image thereon and may be cloth, a plastic film, a sheet, or the like without being limited to paper.

The scanner 4 is installed on the top of the main body of the digital multi-functional peripheral 1. The scanner 4 is a device that optically reads an image of a document. For example, the scanner 4 reads an image of a document that is set on the document glass. Further, the scanner 4 may have a configuration including one that reads an image of a document conveyed by an auto document feeder (ADF).

The operation panel 3 is an user interface. The operation panel 3 includes a display unit (display), a touch panel, an operation button, and the like. The operation panel 3 displays an operation guide or the like on the display unit. The operation panel 3 receives an operation instruction from a user through the touch panel, the operation button, and the like. For example, the operation panel 3 includes a touch panel on a display screen of the display unit and detects a position touched by the user on the display screen of the display unit.

The system controller 5 controls the entire digital multi-functional peripheral 1. The system controller receives the operation instruction input to the operation panel 3 to control the operations of respective units. Further, the system controller 5 receives an operation instruction from an external apparatus connected via an interface to control the operations of the respective units. For example, if an instruction to form an image on a recording medium is given, the system controller 5 controls the printer 2 to form an image on a recording medium.

Hereinafter, a configuration of the printer 2 will be described. As shown in FIG. 1, the printer 2 includes a medium supply mechanism 13, a conveyance mechanism 15, a plurality of image-forming stations SY, SM, SC, and SK, an intermediate transfer belt (transfer belt) 21, a secondary transfer roller 22, a support roller 23, a toner sensor 24, a transfer belt cleaner 25, a fixing device 26, and the like.

The medium supply mechanism 13 includes a plurality of paper feed cassettes 321, 322, and 323. Any number of paper feed cassettes may be provided. Each of the paper feed cassettes 321, 322, and 323 houses paper as recording media S. The paper as the recording media S housed in each paper feed cassette may be paper having different sizes or different types. In the paper feed cassettes 321, 322, and 323, pickup rollers 341, 342, and 343 are respectively disposed. The pickup rollers 341, 342, and 343 respectively pick up paper as a recording medium one by one from the paper feed cassettes 321, 322, and 323. The pickup rollers 341, 342, and 343 each supply the picked-up recording medium S to the conveyance mechanism 15.

The conveyance mechanism 15 conveys the recording medium S. The conveyance mechanism 15 includes first conveyance rollers 521, 522, and 523, a second conveyance roller 54, and a resist roller 56 in a conveyance path where an image is not yet formed on the recording medium S. The conveyance mechanism 15 conveys the recording medium S supplied by each of the pickup rollers 341, 342, and 343 to the second conveyance roller 54 from the first conveyance rollers 521, 522, and 523. In the conveyance mechanism 15, the second conveyance roller 54 further conveys the recording medium S to the resist roller 56.

The resist roller 56 of the conveyance mechanism 15 conveys the recording medium S to a secondary transfer position to be described later in accordance with a timing at which an image is transferred from the intermediate transfer belt 21 to the recording medium S at the secondary transfer position. In the conveyance mechanism 15, the conveyance path is configured such that the recording medium S on which the image has been transferred from the intermediate transfer belt 21 is conveyed to the fixing device 26. Furthermore, the conveyance mechanism 15 includes a third conveyance roller 58 for discharging the paper to a paper discharge unit, a conveyance mechanism that conveys the recording medium S to a reverse unit that reverses the recording medium S, and the like.

Each of the image-forming stations SY, SM, SC, and SK forms an image using toner. In this embodiment, the image-forming station SY forms an image of yellow. The image-forming station SM forms an image of magenta. The image-forming station SC forms an image of cyan. The image-forming station SK forms an image of black. Each of the image-forming stations SY, SM, SC, and SK transfers the image formed using the toner to the intermediate transfer belt 21. A configuration of each of the image-forming stations SY, SM, SC, and SK will be described later in detail.

The intermediate transfer belt 21 is a medium (image carrier) that holds the images transferred by the respective image-forming stations SY, SM, SC, and SK. The intermediate transfer belt 21 is an endless belt as shown in FIG. 1. The intermediate transfer belt 21 moves in a direction indicated by the arrow "a" shown in FIG. 1. The intermediate transfer belt 21 moves the images transferred by the respective image-forming stations SY, SM, SC, and SK to a position at which the secondary transfer roller 22 and the support roller 23 face each other.

The secondary transfer roller 22 and the support roller 23 constitute a transfer unit (secondary transfer unit) that transfers the images from the intermediate transfer belt 21 to the recording medium. The position at which the secondary transfer roller 22 and the support roller 23 face each other is the secondary transfer position at which the images are transferred from the intermediate transfer belt 21 to the recording medium. The secondary transfer roller 22 and the support roller 23 sandwich the intermediate transfer belt 21 and the recording medium therebetween at the secondary transfer position.

The support roller 23 supports the intermediate transfer belt 21. The support roller 23 is a drive roller that drives the intermediate transfer belt 21. The secondary transfer roller 22 faces the support roller 23 with the intermediate transfer belt 21 interposed therebetween. The secondary transfer roller 22 transfers (secondarily transfers) the images, which have been formed using the toner on the transfer surface of the intermediate transfer belt 21, to the surface of the recording medium.

The toner sensor 24 is a sensor that detects the amount of toner (concentration). The toner sensor 24 detects the amount of toner adhering to the intermediate transfer belt 21. The toner sensor 24 is disposed so as to face the transfer surface of the intermediate transfer belt 21. The toner sensor 24 is provided between a transfer position (primary transfer position) of the image formed by each image-forming station and the secondary transfer position in the moving direction "a" of the intermediate transfer belt 21. The toner sensor 24 outputs the detected amount of adhering toner to the system controller 5.

As shown in FIG. 1, the transfer belt cleaner 25 is disposed between the secondary transfer position and the primary transfer position in the moving direction "a" of the intermediate transfer belt 21. The transfer belt cleaner 25 removes the toner on the intermediate transfer belt 21. For example, the transfer belt cleaner 25 removes the remaining toner on the transfer surface of the intermediate transfer belt 21 after the images are transferred from the intermediate transfer belt 21 to the recording medium.

The fixing device 26 fixes the images, which have been formed using the toner and transferred to the recording medium, onto the recording medium. The fixing device 26 is disposed in the conveyance path for the recording medium behind a position at which the recording medium passes through the secondary transfer position. The fixing device 26 includes a pressure roller and a heating roller that face each other. The fixing device 26 applies heat and pressure to the recording medium by conveying the recording medium between the heating roller and the pressure roller that face each other. The fixing device 26 heats the recording medium in a pressurized state to fix the toner images transferred onto the recording medium.

Figure 2:
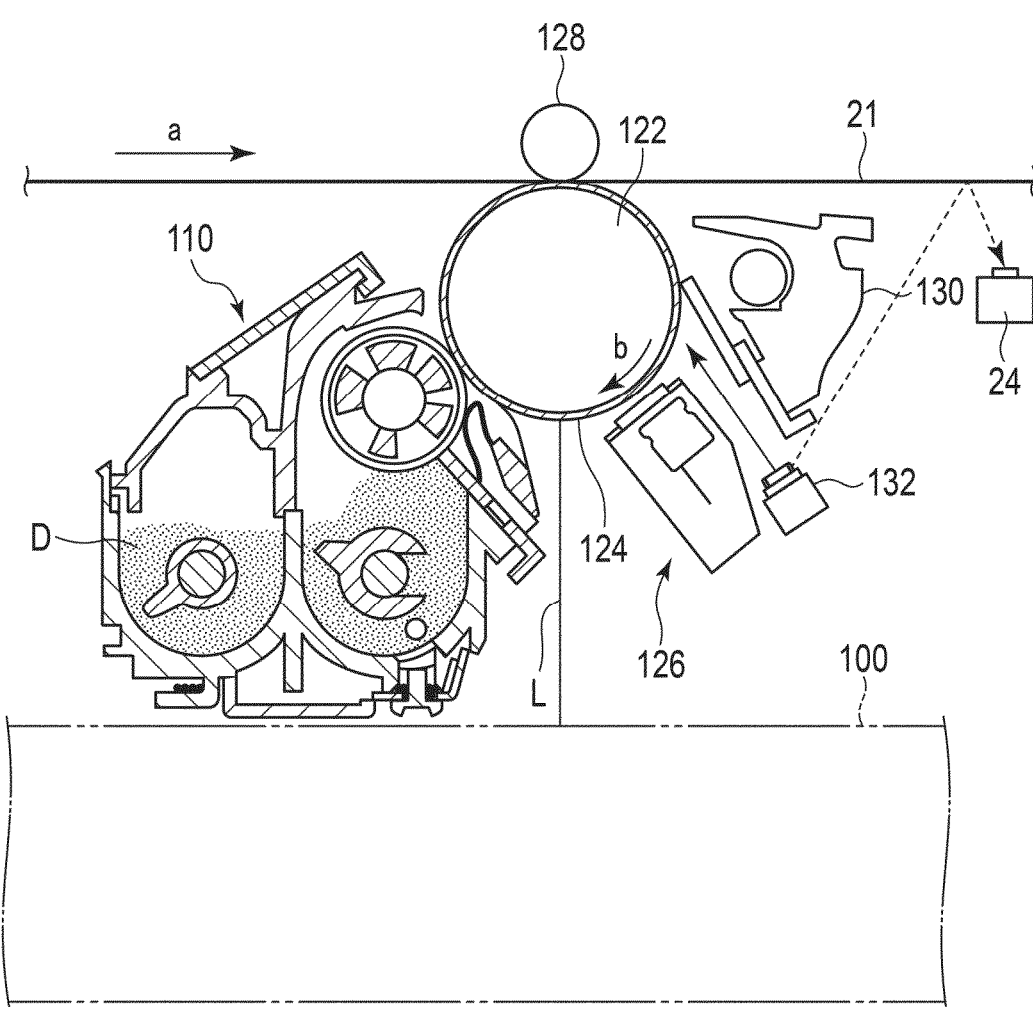
FIG. 2 is a diagram showing an example of an image-forming station in a printer of the digital multi-functional peripheral serving as the image forming apparatus according to the embodiment.

Next, a configuration of each of the image-forming stations SY, SM, SC, and SK in the printer 2 serving as the image forming apparatus according to the embodiment will be described in detail. FIG. 2 is a diagram showing a configuration example of each of the image-forming stations SY, SM, SC, and SK in the printer 2. As shown in FIG. 2, each of the image-forming stations SY, SM, SC, and SK includes an exposure device 100, a developing device 110, a photosensitive drum 122, a charger 126, a primary transfer roller 128, a photoreceptor cleaner 130, a static eliminator 132, and the like. In this embodiment, each of the image-forming stations SY, SM, SC, and SK has the configuration as shown in FIG. 2.

The photosensitive drum 122 is an image carrier including a photoreceptor layer 124 on the surface thereof. The photosensitive drum 122 rotates in a direction matched with the movement of the intermediate transfer belt 21 in the moving direction "a", that is, in a direction indicated by the arrow "b" in FIG. 2. The charger 126, the exposure device 100, the developing device 110, the primary transfer roller 128, the transfer intermediate belt 21, the photoreceptor cleaner 130, and the static eliminator 132 are disposed around the photosensitive drum 122.

The charger 126 uniformly charges the photoreceptor layer 124 on the surface of the photosensitive drum 122. For example, the charger 126 uniformly charges the photoreceptor layer 124 on the surface of the photosensitive drum 122 to the negative polarity.

The exposure device 100 forms an electrostatic pattern (electrostatic latent image) corresponding to the image on the surface of the photosensitive drum 122. The exposure device 100 applies light L, which is controlled to be emitted on the basis of image data, to the surface of the photosensitive drum 122. For example, the exposure device 100 applies the light L emitted on the basis of the image data to the surface of the photosensitive drum 122 via an optical system such as a polygon mirror. The exposure device 100 may be configured to include a device that emits a plurality of laser beams guided to the photosensitive drums 122 of the plurality of image-forming stations. Further, the exposure device 100 may be a light-emitting device provided for each of the plurality of image-forming stations.

The developing device 110 develops the electrostatic latent image, which is formed on the surface of the photosensitive drum 122, using developer. The developing device 110 supplies a developer D to the surface of the photosensitive drum 122 that is exposed by the exposure device 100. The developing device 110 of each image-forming station develops the image with a color corresponding thereto. The developer D is a mixture of a carrier including magnetic fine particles and toner. When the developer D is agitated, the toner is charged by friction. Thus, the toner adheres to the electrostatic latent image formed on the surface of the photosensitive drum 122 by an electrostatic force.

For example, the developing device 110 of the image-forming station SY develops the electrostatic latent image on the photosensitive drum 122 using the toner of yellow. The developing device 110 of the image-forming station SM develops the electrostatic latent image on the photosensitive drum 122 using the toner of magenta. The developing device 110 of the image-forming station SC develops the electrostatic latent image on the photosensitive drum 122 using the toner of cyan. The developing device 110 of the image-forming station SK develops the electrostatic latent image on the photosensitive drum 122 using the toner of black.

The image (toner image) developed on the surface of the photosensitive drum 122 using the toner is moved to a position corresponding to the primary transfer roller 128 by the rotation of the photosensitive drum 122. The primary transfer roller 128 faces the photosensitive drum 122 with the intermediate transfer belt 21 interposed therebetween. The primary transfer roller 128 abuts on the surface of the photosensitive drum 122 with the intermediate transfer belt 21 interposed therebetween. The primary transfer roller 128 transfers (primarily transfers) the toner image on the surface of the photosensitive drum 122 to the intermediate transfer belt 21.

The photoreceptor cleaner 130 is disposed on the downstream of the position, at which the toner image on the surface of the photosensitive drum 122 is transferred to the intermediate transfer belt 21, in the circumferential direction of the photosensitive drum 122. The photoreceptor cleaner 130 removes the toner on the surface of the photosensitive drum 122. In other words, the photoreceptor cleaner 130 removes the toner remaining on the surface of the photosensitive drum 122 after the primary transfer of the toner image from the photosensitive drum 122 to the intermediate transfer belt 21 is performed.

The static eliminator 132 is disposed on the downstream of the position of the photoreceptor cleaner 130 in the circumferential direction of the photosensitive drum 122. The static eliminator 132 emits light (static eliminating light) for removing the electric charge remaining on the photoreceptor layer 124 on the surface of the photosensitive drum 122. The static eliminator 132 emits the static eliminating light by a light source such as a light-emitting diode (LED). The static eliminator 132 is installed such that the static eliminating light emitted from the light source is applied to the surface of the photosensitive drum 122.

In the image forming apparatus according to this embodiment, part of the light (static eliminating light) emitted by the light source of the static eliminator 132 of the image-forming station SK enters the toner sensor 24 as leaked light. According to the example shown in FIG. 2, the leaked light from the light source of the static eliminator 132 is reflected on the intermediate transfer belt 21 as indicated by the dotted line in FIG. 2 and then enters the toner sensor 24. In the image forming apparatus according to this embodiment, a light-shielding wall that blocks the leaked light from the light source of the static eliminator 132 is not installed, and a high-accuracy measurement of the amount of adhering toner is performed using the toner sensor 24. In other words, it is assumed that the image forming apparatus according to this embodiment has a structure in which part of the static eliminating light (leaked light) from the static eliminator 132 enters the toner sensor 24.

Figure 3:
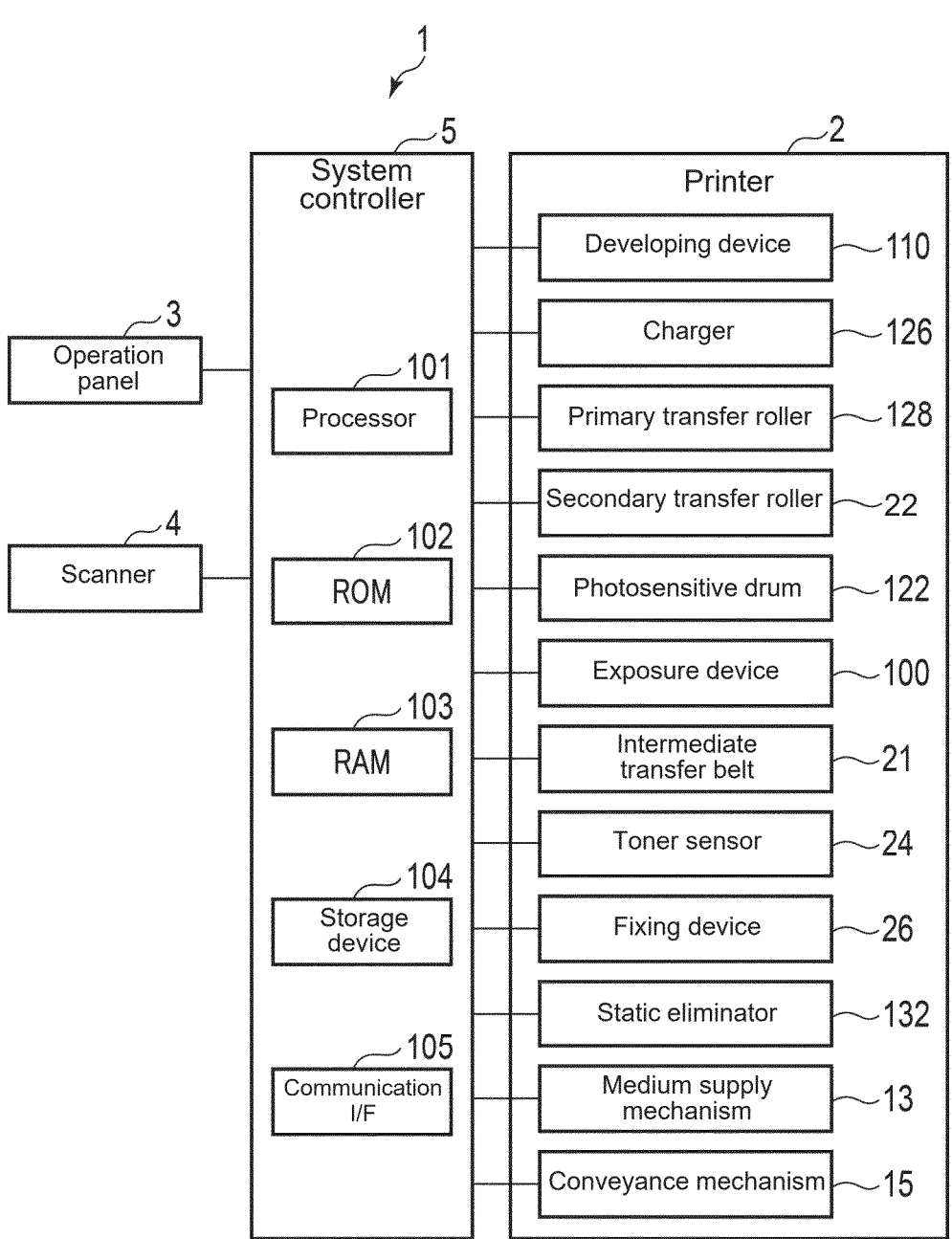
FIG. 3 is a block diagram showing an example of a control system in the digital multi-functional peripheral serving as the image forming apparatus according to the embodiment.

Next, a configuration of a control system in the digital multi-functional peripheral 1 serving as the image forming apparatus according to the embodiment will be described. FIG. 3 is a block diagram showing a configuration example of a control system in the digital multi-functional peripheral 1 serving as the image forming apparatus according to the embodiment. As shown in FIG. 3, a system controller 5 includes a processor 101, a read-only memory (ROM) 102, a random-access memory (RAM) 103, a storage device 104, a communication interface (I/F) 105, and the like. Further, the processor 101 of the system controller 5 is connected to the units in the digital multi-functional peripheral 1 via various interfaces.

The processor 101 implements various types of processing by performing programs. The processor 101 is, for example, a central processing unit (CPU). The processor 101 is connected to the ROM 102, the RAM 103, the storage device 104, the communication I/F 105, and the like. Further, the processor 101 is connected to the units in the printer 2, the operation panel 3, and the scanner 4 via the interfaces.

The ROM 102 is a non-rewritable, non-volatile memory. The ROM 102 operates as a program memory that stores a program. The RAM 103 operates as a working memory or a buffer memory. The processor 101 performs various types of processing by executing a program stored in the ROM 102 or the storage device 104 using the RAM 103.

The storage device 104 is a rewritable, non-volatile memory. For example, the storage device 104 is a storage device such as a hard disk drive (HDD) or a solid-state drive (SSD). The storage device 104 stores data such as control data, a control program, and setting information. The storage device 104 stores image data and the like.

The communication I/F 105 is an interface for performing data communication with an external apparatus. For example, the communication I/F 105 communicates with a user terminal such as a personal computer (PC) or a portable terminal via a network. The communication I/F 105 may input a print request (print job) of the image or the like from the user terminal such as a PC.

Next, an operation of image forming processing in the printer 2 serving as the image forming apparatus according to the embodiment will be described. The digital multi-functional peripheral 1 acquires an image to be formed on a recording medium S and executes image forming processing of printing the acquired image on the recording medium S by the printer 2. For example, an instruction to perform copying is given on the operation panel 3, the processor 101 of the system controller 5 performs processing of printing an image of a document to be read by the scanner 4 on the recording medium S by the printer 2.

When the processor 101 of the system controller 5 performs the image forming processing, the processor 101 takes in a recording medium S housed in a housing unit by the medium supply mechanism 13. The processor 101 causes the conveyance mechanism 15 to convey the recording medium S, which is supplied from the medium supply mechanism 13 in the printer 2, to the front of the resist roller 56.

Further, the processor 101 of the system controller 5 generates images formed by the image-forming stations SY, SM, SC, and SK on the basis of images (print images) to be printed on the recording medium S. For example, the processor 101 generates images of respective colors (yellow, magenta, cyan, and black) respectively formed by the image-forming stations SY, SM, SC, and SK from the print images. After generating the images of the respective colors from the print images, the processor 101 then causes the image-forming stations to form the generated images of the respective colors.

In each of the image-forming stations SY, SM, SC, and SK, the charger 126 charges the photoreceptor layer 124 of the photosensitive drum 122 with a charging bias voltage from a power supply circuit. The processor 101 adjusts (sets) a charging bias voltage by the image stabilization control (image-quality maintaining control). The exposure device 100 applies light for forming an electrostatic latent image corresponding to the image of each color on the photosensitive drum 122 of each of the image-forming stations SY, SM, SC, and SK. The processor 101 adjusts (sets) the power of the light output from the exposure device 100 by the image stabilization control. In each of the image-forming stations SY, SM, SC, and SK, the electrostatic latent image is formed on the photoreceptor layer 124 of the photosensitive drum 122 by the light applied from the exposure device 100.

In each of the image-forming stations SY, SM, SC, and SK, the electrostatic latent image on the photosensitive drum 122 is developed using the toner of a color housed in the developing device 110. In each of the image-forming stations SY, SM, SC, and SK, a developing roller rotates while carrying the developer D containing the toner of each color supplied from a containing unit of the developer. Here, the concentration ratio of the developer D is adjusted (set) by the image stabilization control. A developing bias voltage is applied from the power supply circuit to the developing roller that carries the developer D. The developing device 110 supplies the toner provided in the developer and carried by the developing roller to the electrostatic latent image by a potential difference (contrast potential) between the potential on the developing roller and the electrostatic latent image on the photosensitive drum 122. The processor 101 adjusts (sets) the developing bias voltage, the contrast potential, and the like by the image stabilization control.

In each of the image-forming stations SY, SM, SC, and SK, the photosensitive drum 122 moves the image (toner image) developed by the developing device 110 to a position (primary transfer position) facing the primary transfer roller 128. At the primary transfer position, the photosensitive drum 122 faces the primary transfer roller 128 with the intermediate transfer belt 21 interposed therebetween. A primary-transfer bias voltage is applied from the power supply circuit to the primary transfer roller 128. The toner image on the photosensitive drum 122 is transferred to the intermediate transfer belt 21 by the primary transfer roller 128, to which the primary-transfer bias voltage is applied, at the primary transfer position. When a color image is formed, the image-forming stations SY, SM, SC, and SK superimpose the toner images of the respective colors on the intermediate transfer belt 21 to be transferred. Accordingly, a color image in which the toner images of the respective colors are superimposed is transferred onto the intermediate transfer belt 21.

The intermediate transfer belt 21 moves the transferred toner images to a position (secondary transfer position) facing the secondary transfer roller 22. The resist roller 56 feeds a recording medium S to the secondary transfer position in accordance with the positions and timings of the images transferred onto the intermediate transfer belt 21. Accordingly, the secondary transfer roller 22 and the support roller 23 convey the superimposed intermediate transfer belt 21 and recording medium S while being interposed between the secondary transfer roller 22 and the support roller 23 at the secondary transfer position. A secondary-transfer bias voltage is applied from the power supply circuit to the secondary transfer roller 22. The toner images on the intermediate transfer belt 21 are transferred to the recording medium S by the secondary transfer roller 22, to which the secondary-transfer bias voltage is applied, at the secondary transfer position.

The recording medium S passing through the secondary transfer position is conveyed to the fixing device 26. The fixing device 26 fixes the toner images, which have been transferred from the intermediate transfer belt 21 to the recording medium S at the secondary transfer position, onto the recording medium S. The fixing device 26 applies heat and pressure to the recording medium S on which the toner images have been transferred, thus fixing the toner images onto the recording medium S. The recording medium S passing through the fixing device 26 is discharged from the paper discharge unit with the toner images being fixed thereon.

Next, the image stabilization control using the toner sensor 24 in the digital multi-functional peripheral 1 serving as the image forming apparatus according to the embodiment will be described. The system controller 5 performs the image stabilization control of performing adjustment (setting) for stabilizing images formed on the recording medium S by the image forming processing performed by the printer 2. The image stabilization control is performed, for example, at a predetermined cycle. Further, the image stabilization control may be performed each time a predetermined execution condition is satisfied, or may be performed at any timing. The image stabilization control is performed using the output of the toner sensor 24.

Hereinafter, concentration adjustment using the output of the toner sensor 24 will be described as an example of the image stabilization control. Note that the image stabilization control only needs to be processing performed using the output of the toner sensor 24, and may also be processing of changing a set value of image position adjustment, image gradation adjustment, or the like.

The concentration adjustment as an example of the image stabilization control is processing of adjusting a concentration of the image formed on the recording medium S by the image forming processing performed by the printer 2. The concentration of the image formed on the recording medium S changes depending on the amount of toner (concentration) supplied from the developing roller to the electrostatic latent image when the electrostatic latent image on the photosensitive drum 122 is developed. The system controller 5 adjusts (sets) set values for various types of control such that the output value of the toner sensor 24 reaches a target value indicating a target amount of adhering toner in the concentration adjustment. For example, the system controller 5 adjusts the set values of charging bias, developing bias, exposure power, a developer concentration ratio, and the like such that the output value of the toner sensor 24 reaches a target value.

A reference target value of the concentration adjustment is determined on the basis of a relationship between the output value of the toner sensor 24 and the amount of adhering toner on the transfer belt 21 in the digital multi-functional peripheral 1. The reference target value of the concentration adjustment is stored in the memory such as the storage device 104 for each color of the toner. Note that the digital multi-functional peripheral 1 according to this embodiment stores a target value including a correction value in the memory such as the storage device 104, for the color of toner that needs correction to be described later. The memory such as the storage device 104 stores a target value obtained by adding a correction value to a reference target value, as a target value including a correction value for each type of toner. Further, the memory such as the storage device 104 may store a reference target value and a correction value, as a target value including a correction value for each type of toner. The digital multi-functional peripheral 1 performs the image stabilization control such that the target value obtained by adding the correction value to the reference target value is obtained for the toner of a type for which the correction value is set.

Figure 4:
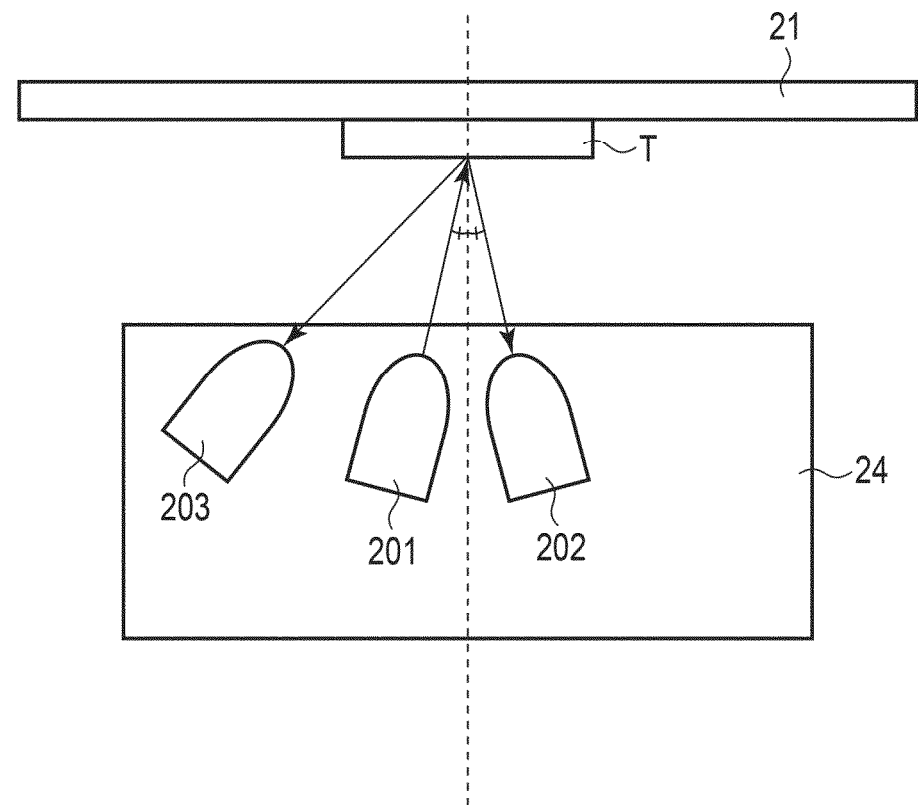
FIG. 4 is a diagram showing an example of a toner sensor in the printer of the digital multi-functional peripheral serving as the image forming apparatus according to the embodiment.

Next, the toner sensor 24 in the digital multi-functional peripheral 1 serving as the image forming apparatus according to the embodiment will be described. FIG. 4 is a diagram showing a configuration example of the toner sensor 24 in the digital multi-functional peripheral 1 serving as the image forming apparatus according to the embodiment. The toner sensor 24 is a sensor for measuring the amount of adhering toner by reading reflected light from the belt surface while using the smoothness of the surface of the transfer belt 21 and the asperities provided by the toner. The toner sensor 24 is, for example, a reflective sensor in which a light-emitting element and a light-receiving element are combined. The image forming apparatus that forms color images uses a plurality of colors of toner. The toner has different optical characteristics depending on the colors. Thus, the toner sensor 24 having the configuration example shown in FIG. 4 highly accurately reads the amount of adhering toner of each color using a single light-emitting element and two light-receiving elements.

In the configuration example shown in FIG. 4, the toner sensor 24 includes a light-emitting element 201, a first light-receiving element 202, and a second light-receiving element 203. The light-emitting element 201 emits detection light with which a location to be a detection surface (surface of the transfer belt 21) is irradiated. The light-emitting element 201 is, for example, an LED. The first light-receiving element 202 and the second light-receiving element 203 are each a photodiode (PD) or a phototransistor (PTr). The first light-receiving element 202 is a regular-reflected-light receiving element that detects regular reflected light on the detection surface with respect to the light emitted from the light-emitting element 201 (incident light). The second light-receiving element 203 is a diffuse-reflection-light receiving element that detects diffuse reflected light on the detection surface.

The amount of adhering toner on the detection surface (surface of the transfer belt 21) is detected on the basis of a detection result of the first light-receiving element 202 and a detection result of the second light-receiving element 203. For example, the black toner adhering to the transfer belt 21 that is the detection surface hardly diffuses and reflects the light (incident light) applied from the light-emitting element 201. Thus, when the black toner adheres to the detection surface, the output value of the second light-receiving element 203 hardly increases. Meanwhile, when the black toner adheres to the detection surface, the output value of the first light-receiving element 202 corresponds to the amount of adhering toner.

On the other hand, the toner of yellow, cyan, magenta, or the like diffuses and reflects the incident light according to each color specified. Thus, when the toner of yellow, cyan, or magenta adheres to the detection surface, the second light-receiving element 203 receives the light diffused by the toner. For example, when the yellow toner adheres to the detection surface, the second light-receiving element 203 receives the light diffused by the yellow toner, and the output value thereof increases in accordance with the characteristics of yellow.

As described above, the toner sensor 24 outputs the information indicating the amount of adhering toner of each color in combination of the output value of the first light-receiving element 202 and the output value of the second light-receiving element 203. In other words, the amount of adhering toner on the detection surface is detected (measured) by calculation in which the output value of the first light-receiving element 202 and the output value of the second light-receiving element 203 are combined.

Note that the toner sensor 24 may be a sensor in which a beam splitter is provided in an optical path from a light-emitting side to a light-receiving side. In this case, the toner sensor includes the light-emitting element, the beam splitter, and the first and second light-receiving elements. The beam splitter splits the light coming from the light-emitting element into P-wave light (regular reflected light) and S-wave light (diffuse reflected light). The first light-receiving element receives the P-wave light (regular reflected light) from the beam splitter. The second light-receiving element receives the S-wave light (diffuse reflected light) from the beam splitter.

The toner sensor 24 thus configured may have a difference in reading (sensor sensitivity) in the output value (read value) for a certain amount of adhering toner. Thus, in order to make the amount of adhering toner on the transfer belt 21 constant, it is necessary to set a target value in the concentration adjustment for each sensor sensitivity of the toner sensor 24. In general, the reference target value in the concentration adjustment is set in accordance with the sensor sensitivity specified from information in the production step of the toner sensor, information in the production step of the digital multi-functional peripheral 1, and the like. Further, the reference target value in the concentration adjustment may be set in accordance with a read result of a reference seal for sensor sensitivity measurement that is provided in advance.

Figure 5:
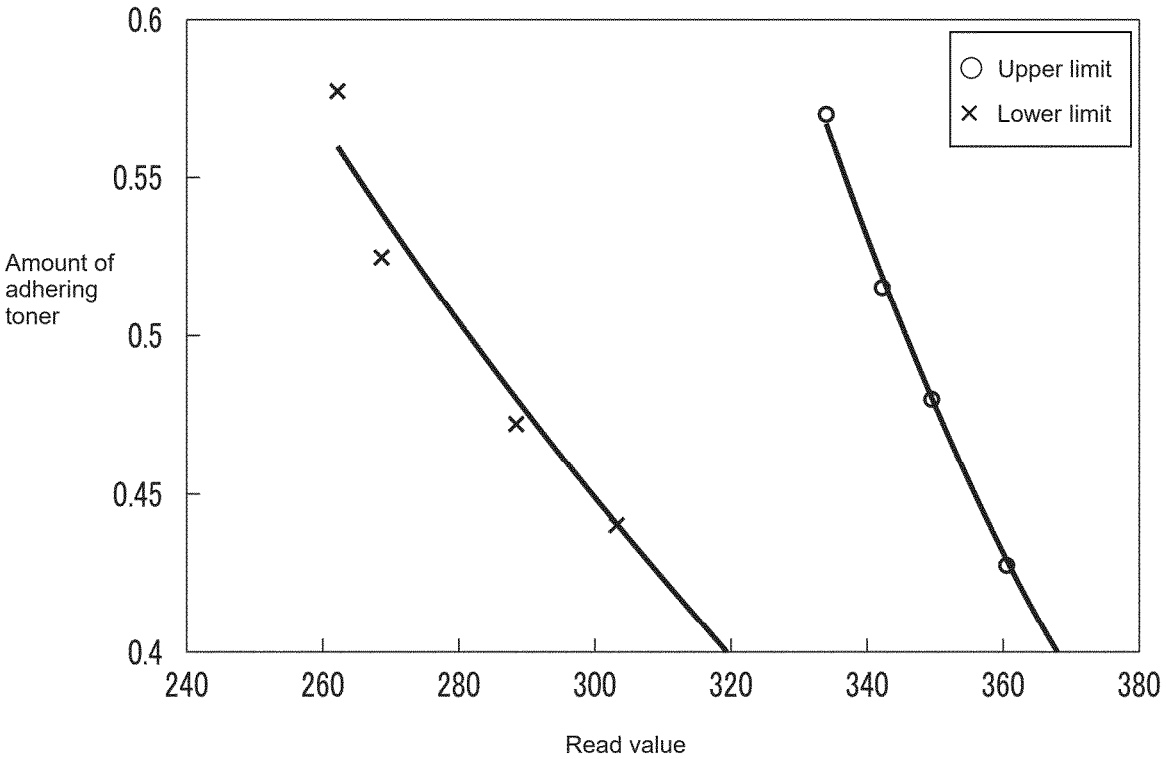
FIG. 5 is a diagram showing an example of a sensor sensitivity of the toner sensor in the printer of the digital multi-functional peripheral serving as the image forming apparatus according to the embodiment.

FIG. 5 is a diagram showing an example of a read value of the toner sensor 24 with respect to the amount of adhering toner in the transfer belt 21. The example of FIG. 5 shows a read value as the upper limit of the toner sensor 24 and a read value as the lower limit thereof with respect to the adhering toner. As shown in FIG. 5, the toner sensor 24 generates a difference in read value with respect to a particular amount of adhering toner due to the difference in sensor sensitivity. A target value is set for the output value of the toner sensor 24 for each color of the toner. Thus, the target value for the toner sensor 24 for each color of toner is set for each sensor sensitivity.

Next, the influence of leaked light of the light (static eliminating light) emitted by the static eliminator 132 on the output of the toner sensor 24 will be described. If the output of the toner sensor 24 is not affected by the static eliminating light, the output value of the toner sensor 24 is adjusted to be the reference target value of the concentration adjustment, so that the amount of adhering toner becomes a predetermined target amount. However, if the output of the toner sensor 24 is affected by the leaked light of the static eliminating light, the amount of adhering toner may vary even when the output value of the toner sensor 24 is adjusted to be the reference target value.

Figure 6:
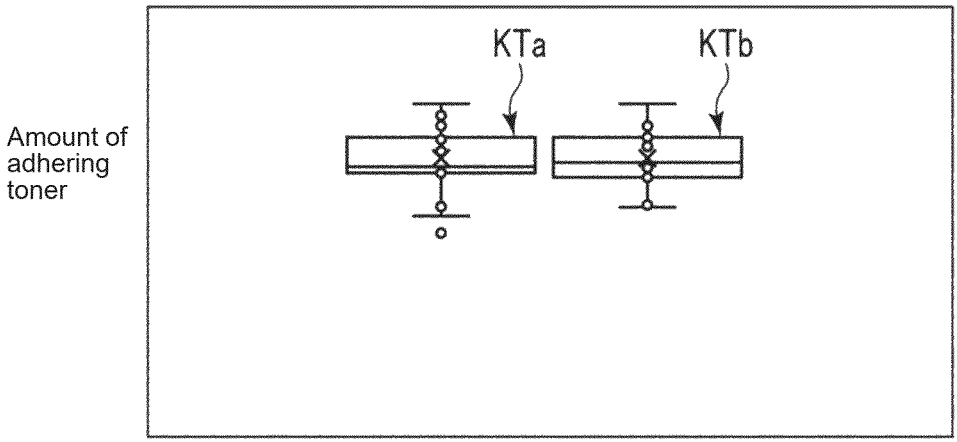
FIG. 6 is a diagram showing an example of detecting the amount of adhering toner of black on a transfer belt used in the printer of the digital multi-functional peripheral serving as the image forming apparatus according to the embodiment.

FIG. 6 is a diagram showing an example of the amount of adhering black toner when the leaked light of the static eliminating light enters the toner sensor 24 and when the static eliminating light does not enter the toner sensor 24. The amount of adhering toner KTa indicates the amount of black toner adhering to the transfer belt 21 when it is adjusted to have the reference target value of the concentration adjustment in a state where the leaked light does not enter the toner sensor 24. Further, the amount of adhering toner KTb indicates the amount of black toner adhering to the transfer belt 21 when it is adjusted to have the reference target value of the concentration adjustment in a state where the leaked light enters the toner sensor 24. According to the example shown in FIG. 6, the difference between the amount of adhering toner KTa and the amount of adhering toner KTb is small, and it is conceivable that an image actually printed on a recording medium is less affected.

Figure 7:
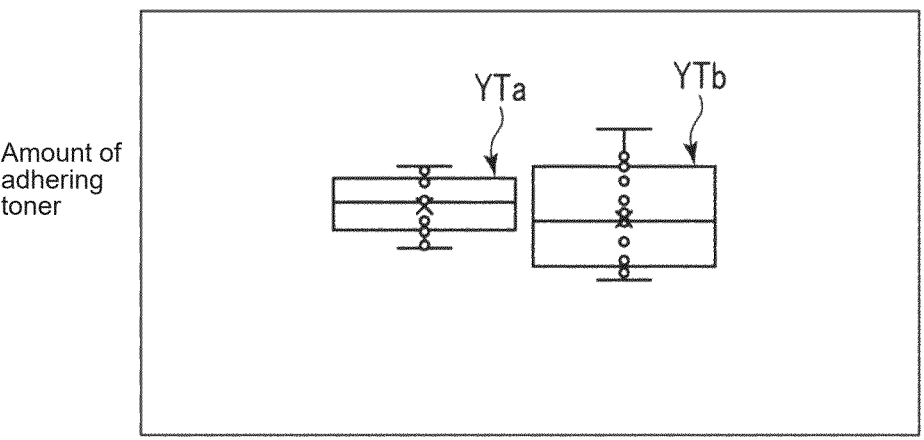
FIG. 7 is a diagram showing an example of detecting the amount of adhering toner of yellow on the transfer belt used in the printer of the digital multi-functional peripheral serving as the image forming apparatus according to the embodiment.

FIG. 7 is a diagram showing an example of the amount of adhering yellow toner when the leaked light of the static eliminating light enters the toner sensor 24 and when the static eliminating light does not enter the toner sensor 24. The amount of adhering toner YTa indicates the amount of yellow toner adhering to the transfer belt 21 when it is adjusted to have the reference target value of the concentration adjustment in a state where the leaked light does not enter the toner sensor 24. The amount of adhering toner YTb indicates the amount of yellow toner adhering to the transfer belt 21 when it is adjusted to have the reference target value of the concentration adjustment in a state where the leaked light enters the toner sensor 24. According to the example shown in FIG. 7, the difference between the amount of adhering toner YTa and the amount of adhering toner Ytb is large, and it is conceivable that an image actually printed on a recording medium is affected to a large extent. Therefore, in order to stabilize the amount of adhering yellow toner in the image stabilization control, it is necessary to correct the influence of the leaked light of the static eliminating light.

Further, as shown in FIGS. 6 and 7, the amount of adhering yellow toner is largely affected by the leaked light (static eliminating light), whereas the amount of adhering black toner is not affected (slightly affected) by the leaked light. In such a manner, the influence of the static eliminating light differs depending on the type (color) of toner. As shown in FIG. 2, the digital multi-functional peripheral 1 serving as the image forming apparatus according to the embodiment has a structure in which the leaked light of the static eliminating light emitted from the static eliminator 132 enters the toner sensor 24. Thus, the digital multi-functional peripheral 1 according to the embodiment corrects the influence of the leaked light for each type of toner in the image stabilization control such as the concentration adjustment.

Next, description will be given on the influence of the leaked light of the static eliminating light in the various types of toner will be described. As shown in FIGS. 6 and 7, the influence of the static eliminating light is caused or not caused depending on the type of toner, because each type of toner has a spectral reflectivity that differs depending on the wavelength of the static eliminating light. The toner sensor 24 detects the amount of adhering toner of each color by detecting the diffused light by the second light-receiving element 203. Therefore, it is conceivable that the output value of the toner sensor 24 largely varies when the amount of adhering toner, the spectral reflectivity of which increases by the wavelength of the static eliminating light, is detected (measured).

Figure 8:
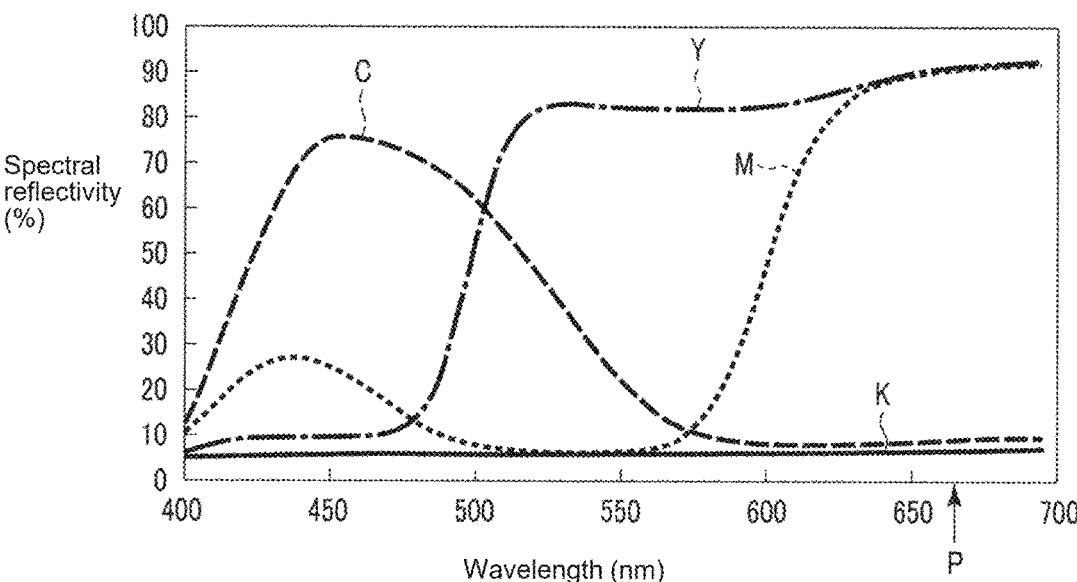
FIG. 8 is a diagram showing an example of a spectral reflectivity to the toner of each color used in the printer of the digital multi-functional peripheral serving as the image forming apparatus according to the embodiment.

FIG. 8 is a diagram showing the spectral reflectivity with respect to the wavelength of irradiation light in various types of toner. In FIG. 8, a curve Y, a curve M, a curve C, and a curve K represent the spectral reflectivity of yellow toner, magenta toner, cyan toner, and black toner, respectively. Further, in FIG. 8, a wavelength P is the wavelength of the light emitted by the light-emitting element 201 of the toner sensor 24. In the example shown in FIG. 8, the wavelength P of the light emitted by the light-emitting element 201 of the toner sensor 24 is approximately 650 to 670 nm.

As shown in FIG. 8, various types of toner each have a different spectral reflectivity with respect to the wavelength of the irradiation light. Further, various types of toner each have a spectral reflectivity varying depending on the wavelength of the irradiation light. As shown in FIG. 2, in the image forming apparatus having the configuration in which the leaked light of the static eliminating light emitted from the static eliminator 132 enters the toner sensor 24, an influence corresponding to the wavelength of the static eliminating light is caused for each type (color) of toner. In the image forming apparatus, the static eliminator 132 emits static eliminating light having a specific wavelength. In this case, the amount of influence of the static eliminating light (leaked light) having a specific wavelength, which appears in the output of the toner sensor 24, can be grasped for each type (color) of toner.

Next, description will be given on the correction of a target value (set value) used for the concentration adjustment as the image stabilization control in accordance with the amount of influence of the leaked light of the static eliminating light on various types of toner. In order to stabilize the image by suppressing variations in concentration, the digital multi-functional peripheral 1 corrects the reference target value of the concentration adjustment for the toner of each type (color) in accordance with the amount of influence caused by the leaked light of the static eliminating light. As described above, the set value (target value) of the image stabilization control such as the concentration adjustment is set in accordance with the sensor sensitivity of the toner sensor 24. The amount of influence of the static eliminating light in the output of the toner sensor 24 also varies depending on the sensor sensitivity. Therefore, the target value of the image stabilization control such as the concentration adjustment is corrected by adding a correction value corresponding to the amount of influence of the static eliminating light according to the sensor sensitivity.

For example, in the system controller 5, the storage device 104 stores a target value obtained by correcting, for each toner, a reference target value corresponding to the sensor sensitivity with a correction value corresponding to the amount of influence of the static eliminating light. Further, the storage device 104 may store, for each toner, a reference target value and a correction value corresponding to the amount of influence of the static eliminating light. The processor 101 of the system controller 5 executes the image stabilization control using the target value obtained by correcting, for each toner, the reference target value the with correction value corresponding to the amount of influence of the static eliminating light. This makes it possible for the digital multi-functional peripheral 1 to suppress variations in concentration in specific toner while eliminating the influence of the leaked light of the static eliminating light, and to stabilize the image.

Figure 9:
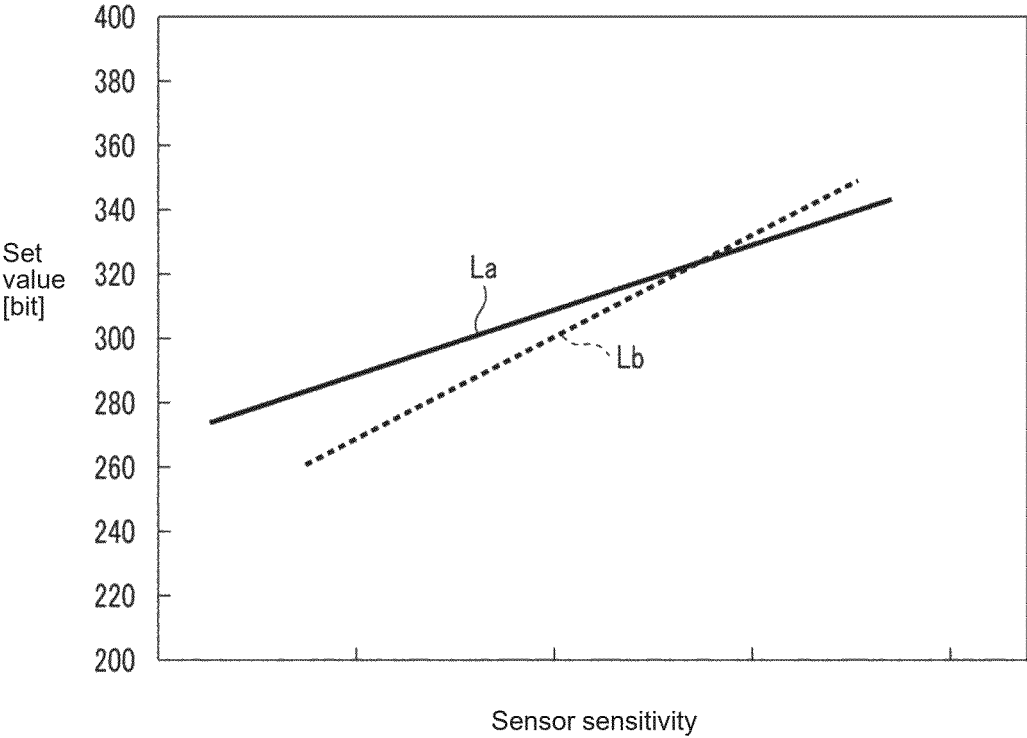
FIG. 9 is a diagram showing an example of a relationship between a sensor sensitivity of the toner sensor and a set value in the printer of the digital multi-functional peripheral serving as the image forming apparatus according to the embodiment.

FIG. 9 is a diagram showing an example of the set value (target value) of the image stabilization control according to the sensor sensitivity of the toner sensor 24. In FIG. 9, a line La indicates an exemprary set value (reference target value without correction corresponding to the amount of influence of static eliminating light) when there is no influence of the leaked light of the static eliminating light. A line Lb indicates an exemprary set value (corrected target value) obtained by adding a correction value corresponding to the amount of influence of the leaked light of the static eliminating light. According to the example shown in FIG. 9, if the sensor sensitivity is lower than the intersection of the line La and the line Lb, the target value of the image stabilization control is corrected to be smaller. Further, if the sensor sensitivity is higher than the intersection of the line La and the line Lb, the target value of the image stabilization control is corrected to be larger.

As described above, the image forming apparatus according to the embodiment corrects the target value for the output value of the toner sensor, which is used for the image stabilization control such as the concentration adjustment, in accordance with the amount of influence of the static eliminating light. The image forming apparatus performs image stabilization control such as concentration adjustment of each toner by using the corrected set value corresponding to the amount of influence of the static eliminating light. Accordingly, the image forming apparatus can suppress variations in the output of the toner sensor, which result from the leaked light coming from the static eliminator, and can perform the image stabilization control with the variations in the concentration being suppressed.

Next, description will be given on the correction of a target value (set value) used for the image stabilization control in accordance with the amount of influence of the leaked light of the static eliminating light on the various types of toner. According to the example shown in FIG. 8 described above, the black toner (curve K) has a low spectral reflectivity regardless of the wavelength of the irradiation light. On the other hand, the yellow toner (curve Y), the magenta toner (curve M), and the cyan toner (curve C) differ from each other in the wavelength at which the spectral reflectivity increases and the wavelength at which the spectral reflectivity decreases. In the toner sensor 24, when the spectral reflectivity is low, the variations in the output value caused by the static eliminating light are small. If the variations in the output value of the toner sensor 24 caused by the static eliminating light are small, the leaked light of the static eliminating light hardly affects the detection of the amount of adhering toner. For that reason, for a toner having a low spectral reflectivity with respect to the wavelength of the static eliminating light, correction according to the influence of the static eliminating light may be unnecessary. Therefore, the image forming apparatus may determine the toner that needs correction for the amount of influence of the static eliminating light in accordance with the wavelength of the static eliminating light emitted by the static eliminator 132.

In the example shown in FIG. 8, when the wavelength of the irradiation light is 650 nm, the yellow toner and the magenta toner have a high spectral reflectivity, and the cyan toner and the black toner have a low spectral reflectivity. When the wavelength of the static eliminating light includes 650 nm, the output of the toner sensor 24 is strongly affected by the static eliminating light if the detection target is the yellow or magenta toner. When the wavelength of the static eliminating light includes 650 nm, the output of the toner sensor 24 is hardly affected by the static eliminating light if the detection target is the cyan or black toner. When the wavelength of the static eliminating light includes 650 nm, the reference target value for the cyan or black toner is not corrected, and the reference target value for the yellow and magenta toner is corrected. In this case, the image forming apparatus adds a correction value corresponding to the amount of influence of the static eliminating light to the reference target value for the yellow and magenta toner.

FIG. 10 is a diagram showing an example in which the presence or absence of the correction corresponding to the amount of influence of the static eliminating light is set for each of the various types of toner in accordance with the wavelength of the static eliminating light. FIG. 10 shows an example in which the presence or absence of the correction corresponding to the amount of influence of the static eliminating light is set on the basis of the spectral reflectivity of various types of toner as shown in FIG. 8. For example, in the example shown in FIG. 8, if the spectral reflectivity is approximately 10% or less, it is assumed that the reference target value of the image stabilization control is not necessary to be corrected. In this case, when the wavelength of the static eliminating light is 400 nm or less, it is assumed that the reference target value of the image stabilization control for the toner of yellow, magenta, cyan, and black is not necessary to be corrected (without correction). Further, when the wavelength of the static eliminating light is 400 to 480 nm, it is assumed that the reference target value for the toner of yellow and black is not necessary to be corrected. When the wavelength of the static eliminating light is 480 to 570 nm, it is assumed that the reference target value for the toner of magenta and black is not necessary to be corrected. When the wavelength of the static eliminating light is 570 nm or more, it is assumed that the reference target value for the toner of cyan and black is not necessary to be corrected.

If the presence or absence of the correction for each wavelength is summarized, as shown in FIG. 10, a table for determining the presence or absence of the correction corresponding to the amount of influence of the static eliminating light in accordance with the wavelength of the static eliminating light for each color of the toner is obtained. For example, in the image forming apparatus in which the wavelength of the static eliminating light is equal to or larger than the wavelength of 570 nm, it is determined that the reference target value for the toner of yellow and magenta is to be corrected. In this case, the image forming apparatus stores, in the storage device 104, a target value obtained by correcting the reference target value for yellow and magenta with a correction value corresponding to the amount of influence of the static eliminating light.

As described above, the image forming apparatus according to the embodiment determines the type (color) of toner that is to be subjected to correction corresponding to the amount of influence of the static eliminating light in accordance with the wavelength of the static eliminating light. The image forming apparatus stores, in a memory, a target value including a correction value of the image stabilization control for the toner that is to be corrected in accordance with the wavelength of the static eliminating light. Accordingly, the image forming apparatus can specify whether or not the correction corresponding to the influence of the static eliminating light is necessary for each type of toner. As a result, the image forming apparatus can highly accurately perform the image stabilization control excluding the influence of the static eliminating light without attaching a member or the like for blocking the leaked light of the static eliminating light.

Next, description will be given on the update of the correction value corresponding to the amount of influence of the static eliminating light in the digital multi-functional peripheral 1 serving as the image forming apparatus according to the embodiment. The digital multi-functional peripheral 1 serving as the image forming apparatus may update the correction value corresponding to the amount of influence of the static eliminating light in accordance with a predetermined update condition. In the digital multi-functional peripheral 1, it is assumed that the amount of influence of the static eliminating light in the detection of the amount of adhering toner using the toner sensor 24 varies depending on the degree of use, a temporal change, or the like. This is because the state of each unit constituting the printer 2 changes by the degree of use or a temporal change.

For example, it is assumed that the state of the light resulting from the static eliminating light (leaked light), which is emitted by the static eliminator 132 and then enters the toner sensor 24, changes by the degree of use or a temporal change. As a specific example, when the printer 2 repeats the image forming processing, it is assumed that the amount of light emitted from the static eliminator 132 changes or that the static eliminator 132 is contaminated with toner or the like. When the state of the static eliminating light emitted by the static eliminator 132 changes, the amount of influence of the static eliminating light in the detection of the amount of adhering toner using the toner sensor 24 also changes.

It is assumed that the variations in the amount of influence of the static eliminating light due to the degree of use, a temporal change, or the like in the digital multi-functional peripheral 1 are estimated in advance. If the variations in the amount of influence of the static eliminating light are estimated, a correction value corresponding to the amount of influence of the static eliminating light in the update condition such as the degree of use or a temporal change can be set in advance. It is assumed that the storage device 104 stores a correction value corresponding to the amount of influence of the static eliminating light in a predetermined update condition such as the degree of use or a temporal change. Accordingly, the digital multi-functional peripheral 1 updates the correction value for the target value of the image stabilization control to the correction value corresponding to the update condition when the degree of use, a temporal change, or the like satisfies the update condition.

As the update condition for updating the correction value for the target value of the image stabilization control, the number of recording media (the number of prints) on which printing is performed, the driving time or the elapsed time of a specific unit, and the like are set. For example, if it is assumed that the state of the static eliminating light changes due to repetition of printing, the digital multi-functional peripheral 1 sets a predetermined number of prints as the update condition of the correction value. In this case, the system controller 5 stores in the storage device 104 in advance a correction value corresponding to the amount of influence of the static eliminating light when printing of a predetermined number of prints, which is to be set as the update condition, is performed. The processor 101 of the system controller 5 stores a cumulative value of the number of prints (the cumulative number of prints) in the storage device 104 every time printing is performed. When the cumulative number of prints reaches a predetermined number of prints that is the update condition, the processor 101 updates the correction value to a target value obtained by correcting the reference target value with the correction value corresponding to the predetermined number of prints stored in the storage device 104.

Further, assuming that the state of the static eliminating light changes in accordance with the driving time (cumulative driving time) of a specific unit, the digital multi-functional peripheral 1 may set a driving time as the update condition of the correction value. The driving time as the update condition of the correction value can be set as the driving time of the photosensitive drum 122, the driving time of the developing device 110, the driving time of the transfer belt 21, or the like.

For example, when the update condition is set for the driving time of the photosensitive drum 122, the system controller 5 stores a correction value corresponding to a predetermined driving time as the update condition in the storage device 104. The processor 101 of the system controller 5 stores the cumulative value of the driving time of the photosensitive drum 122 in the storage device 104 every time the photosensitive drum 122 is driven. When the cumulative value of the driving time of the photosensitive drum 122 reaches a predetermined driving time set as the update condition, the processor 101 updates the correction value to a target value obtained by correcting the reference target value with the correction value corresponding to the predetermined driving time stored in the storage device 104. Note that the correction value can be updated also for the driving time of the developing device 110 or the driving time of the transfer belt 21 in the same manner as the driving time of the photosensitive drum 122.

Furthermore, assuming that the state of the static eliminating light changes in accordance with the elapsed time, the digital multi-functional peripheral 1 may set the elapsed time as the update condition of the correction value. For the elapsed time as the update condition of the correction value, a light-emission time of the static eliminating light emitted by the static eliminator 132, or the like can be set. For example, when the update condition is set for the light-emission time of the static eliminating light, the system controller 5 stores a correction value corresponding to a predetermined elapsed time as the update condition in the storage device 104. The processor 101 of the system controller 5 stores a cumulative value of the light-emission time of the static eliminating light in the storage device 104 every time the static eliminator 132 emits the static eliminating light. When the cumulative value of the light-emission time of the static eliminating light reaches a predetermined elapsed time as the update condition, the processor 101 updates the correction value to a target value obtained by correcting the reference target value with the correction value corresponding to the predetermined elapsed time stored in the storage device 104.

Figure 11:
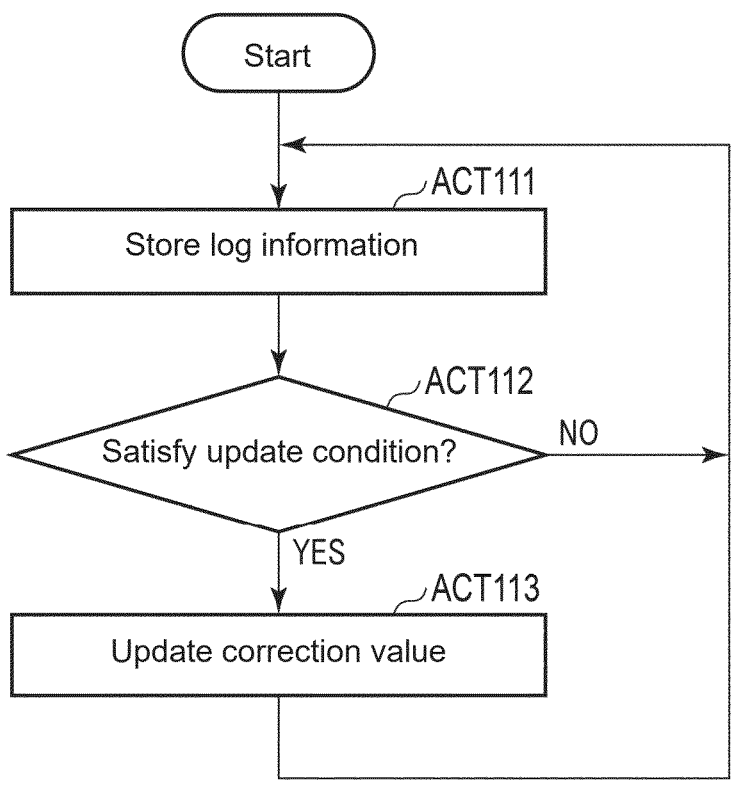
FIG. 11 is a flowchart showing an example of processing of updating a correction value to a target value of the image stabilization control in the digital multi-functional peripheral serving as the image forming apparatus according to the embodiment.

FIG. 11 is a flowchart for describing processing of updating the correction value for the target value of the image stabilization control in the digital multi-functional peripheral 1 serving as the image forming apparatus according to the embodiment. The processor 101 of the system controller 5 in the digital multi-functional peripheral 1 accumulates, in the storage device 104, log information indicating the degree of use, an elapsed time, or the like according to the execution of the image forming processing (ACT111). For example, when a predetermined number of prints is set as the update condition, the processor 101 stores log information including the cumulative number of prints in the storage device 104. Further, when the driving time (or elapsed time) of a specific unit is set as the update condition, the processor 101 stores log information including a cumulative driving time (or elapsed time) of the specific unit in the storage device 104.

The processor 101 determines whether or not the log information stored in the storage device 104 has satisfied the update condition of the correction value for the target value of the image stabilization control (ACT112). For example, if the predetermined number of prints is set as the update condition, the processor 101 determines whether or not the cumulative number of prints stored in the storage device 104 has reached the predetermined number of prints set as the update condition. If the predetermined driving time is set as the update condition, the processor 101 determines whether or not the cumulative driving time of the specific unit has reached the predetermined driving time set as the update condition.

If the log information stored in the storage device 104 has not satisfied the update condition (NO in ACT112), the processor 101 returns to ACT111 described above and continues to accumulate the log information. If the information indicated by the log information stored in the storage device 104 has satisfied the update condition (YES in ACT112), the processor 101 updates the correction value for the reference target value of the image stabilization control to the correction value corresponding to the update condition (ACT113). If the correction value is updated, the processor 101 updates the target value for each toner to a target value obtained by correcting the reference target value with the correction value corresponding to the update condition. For example, if the cumulative number of prints reaches predetermined number of prints as the update condition, the processor 101 updates the correction value for the reference target value to the correction value corresponding to the predetermined number of prints as the update condition. If the cumulative driving time of the specific unit reaches a predetermined driving time set as the update condition, the processor 101 updates the correction value for the reference target value to the correction value corresponding to the predetermined drive time.

As described above in detail, the image forming apparatus according to the embodiment includes the toner sensor that outputs a signal corresponding to the amount of adhering toner on the transfer belt. The image forming apparatus stores a target value including a correction value of image stabilization control for stabilizing an image, for each type of toner, in a memory. The image forming apparatus performs the image stabilization control of adjusting a set value used in the image forming processing such that an output value of the toner sensor becomes the target value including the correction value describe above.

Accordingly, the image forming apparatus according to the embodiment can stabilize the image without attaching a light-shielding wall or the like for blocking the static eliminating light emitted by the static eliminator. In other words, the image forming apparatus according to the embodiment can stabilize the image without adding a component or the like thereto even in a structure in which part of the static eliminating light emitted from the static eliminator enters the toner sensor so as to achieve a reduction in size or a reduction in cost.

Furthermore, the image forming apparatus according to the embodiment stores the log information indicating the degree of use, the elapsed time, or the like in the memory. The image forming apparatus updates the correction value for the target value of the image stabilization control of stabilizing the image in accordance with the log information accumulated in the memory. Accordingly, the image forming apparatus can update the correction value to a correction value suitable for the state when the state of the static eliminating light or the like varies in accordance with the cumulative number of prints, the driving time of the specific unit, or the elapsed time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An image forming apparatus comprising:
a photoreceptor;
a static eliminator that emits static eliminating light to be applied to the photoreceptor;

a charger that charges the photoreceptor from which electric charge is removed by the static eliminator;

an exposure device that forms an electrostatic latent image on the photoreceptor charged by the charger;

a developing device that supplies toner to the photoreceptor on which the electrostatic latent image is formed by the exposure device;

a toner sensor that outputs a signal corresponding to an amount of adhering toner on an image carrier to which the toner is transferred from the photoreceptor;

a memory that stores a target value including a correction value of image stabilization control of stabilizing an image for each type of toner; and a processor that performs the image stabilization control of setting an output value of the toner sensor to the target value including the correction value for each type of toner, wherein the correction value is an amount of correction that varies depending on the type of toner and a wavelength of the static eliminating light emitted by the static eliminator, the toner sensor includes a light-emitting element that applies light to a detection surface, a first light-receiving element that receives regular reflected light on the detection surface, and a second light-receiving element that receives diffused light on the detection surface, and the memory stores, as the correction value, the amount of correction for toner of a specific color selected on a basis of a spectral reflectivity for each color of toner with respect to the wavelength of the static eliminating light.

2. The image forming apparatus according to claim 1, wherein the amount of correction varies also depending on a sensor sensitivity of the toner sensor.

3. The image forming apparatus according to claim 1, wherein the static eliminator emits static eliminating light having a wavelength of 570 nm or more, and the memory stores, as the correction value, the amount of correction for toner of yellow and the amount of correction for toner of magenta.

4. The image forming apparatus according to claim 1, wherein the processor updates the correction value stored in the memory in accordance with the number of recording media to which a toner image is transferred from the image carrier by the image forming apparatus.

5. The image forming apparatus according to claim 1, wherein the processor updates the correction value stored in the memory in accordance with a driving time of the photoreceptor.

6. The image forming apparatus according to claim 1, wherein the processor updates the correction value stored in the memory in accordance with a driving time of the developing device.

7. The image forming apparatus according to claim 1, wherein the processor updates the correction value stored in the memory in accordance with a driving time of the image carrier.

8. The image forming apparatus according to claim 1, wherein the processor updates the correction value stored in the memory in accordance with a light-emission time during which the static eliminator emits the static eliminating light.

* * * * *